Jan. 29, 1963   SHINZO SUMIYA   3,075,578
MULTIPLE VACUUM EFFECT EVAPORATOR

Filed July 27, 1959   2 Sheets-Sheet 1

INVENTOR.
SHINZO SUMIYA
BY
Wenderoth, Lind & Ponack
Attys.

United States Patent Office 3,075,578
Patented Jan. 29, 1963

3,075,578
MULTIPLE VACUUM EFFECT EVAPORATOR
Shinzo Sumiya, 860 Hagoromo, Takaishi-cho, Senboku-gun, Osaka Prefecture, Japan
Filed July 27, 1959, Ser. No. 829,750
3 Claims. (Cl. 159—17)

This invention relates to improvements in the multiple effect vacuum evaporator of the external heater type, and has for its objects to minimize the floor space, component parts and the height of the apparatus, and to increase thereby the evaporating efficiency of the system.

Figure 1:
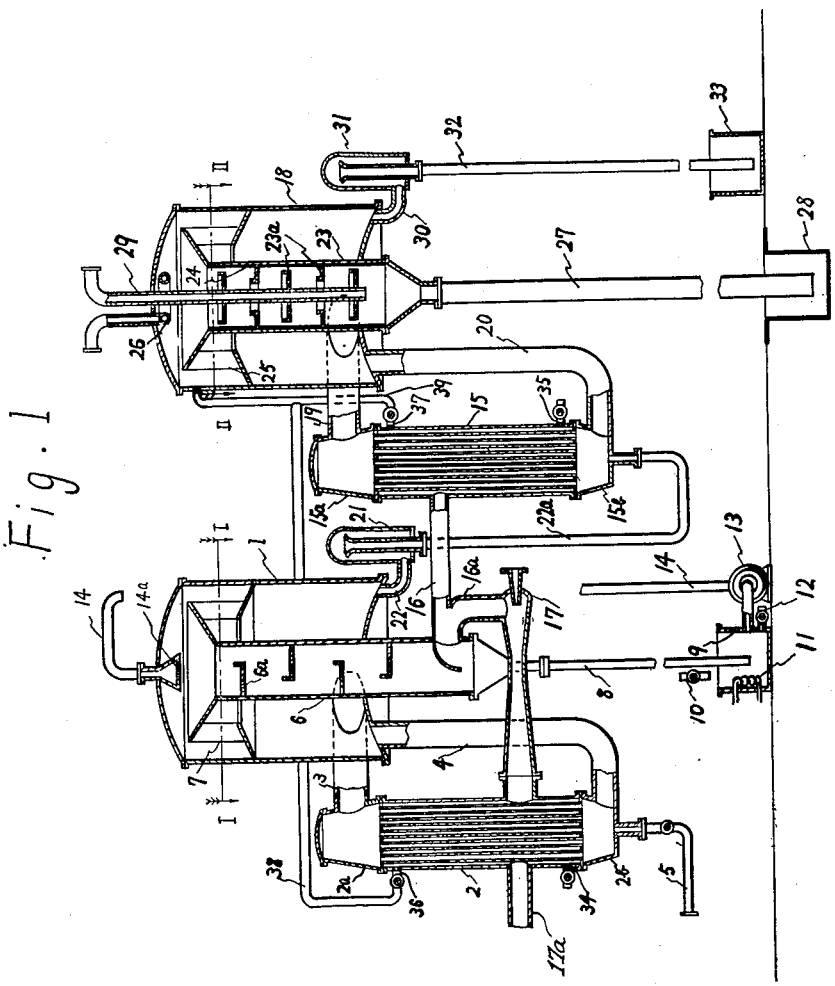
Figure 2:
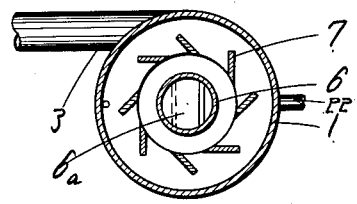
Figure 3:
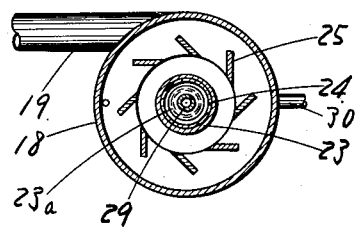

In order to provide a better understanding of this invention, one form of the invention embodying the principles of the same in the form of a two-stage evaporator is illustrated in the accompanying drawings, in which FIGURE 1 is a sectional elevation view of the apparatus, FIGURE 2 is a horizontal sectional view of the same along the line I—I, and FIGURE 3 is a horizontal sectional view of the same along the line II—II.

Referring now to the drawings, the first stage vapor separator vessel 1 is associated with the vapor generator 2 in such a manner that the upper liquid chamber 2a of the vapor generator 2 is connected to the lower side portion of the vapor separator vessel 1 by means of a tangential vapor-liquid conveyor pipe 3, and that the lower liquid chamber 2b of the vapor generator 2 is connected to the bottom side portion of the vapor separator vessel 1 by means of a conduit pipe 4. Consequently, the liquid material being evaporated circulates through the circulating system consisting of said component parts in the order of 2, 2a, 3, 1, 4 and 2b, the liquid material being introduced into the vapor generator 2 by way of an intake pipe 5 secured to the lower liquid chamber 2b.

Inside the vapor separating vessel 1 is positioned a vapor scrubbing member 6 in association with an entrainment separating member 7. The vapor scrubbing member 6 is so spaced from the inner surface of the outer cylindrical wall of the vapor separating vessel 1 as to provide a suitable space for the vapor separated in the vessel 1 to travel upward in a spiral movement round the scrubbing member 6, so that the vapor in the spiral movement passes through the entrainment separating member 7 and flows into the vapor scrubbing member 6, and finally travels downward therethrough along with the washing solution showering into the scrubbing member 6 by way of the nozzle 14a.

The lower portion of the vapor scrubbing member 6 penetrates the bottom portion of the vapor separating vessel 1, and is provided with a down-take 8 terminating in a washing solution containing vessel 9. Said vessel 9 is equipped with washing solution intake 10, heating member 11 and washing solution outlet 12. The inside portion of the vapor scrubbing member 6 is provided with perforated shower trays 6a. The washing solution containing vessel 9 is associated with a pump 13 having a conduit pipe 14, and the conduit pipe 14 is provided with a nozzle 14a opening into the vapor separating vessel 1 above the vapor scrubbing member 6. These members are so associated with one another that the washing solution circulates through the vapor scrubbing system consisting of said members in the order of 9, 13, 14, 14a, 6 and 8.

The lower side portion of the vapor scrubbing member 6 is further associated with the second stage vapor generator 15 by means of a vapor conveying pipe 16, and with the first stage vapor generator 2 by means of a vapor conveying pipe 16a. Thus the vapor which is separated in the first stage vapor separating vessel 1 and travelling through the vapor scrubbing member 6 therein is divided into two portions, so that one of said portions is caused to pass into the second stage vapor generator 15 by way of the vapor conveying pipe 16 and the other into the first stage vapor generator 2 by way of the vapor conveying pipe 16a via a booster 17 which is attached to the pipe 16a.

In the second stage evaporating system, the vapor generator 15 is associated with the vapor separating vessel 18 in such a manner that the upper liquid-vapor chamber 15a of the vapor generator 15 is connected to the lower side portion of the vapor separating vessel 18 by means of a tangential vapor-liquid conveying pipe 19, and that the lower liquid chamber 15b of the vapor generator 15 is connected to the bottom portion of the vapor separating vessel 18 by means of a conduit pipe 20. The vapor generator 15, on the other hand, is associated with the first stage vapor separating vessel 1 by way of a level controller 21 which is connected to the first stage vapor separating vessel 1 by means of a conduit pipe 22 and to the second stage vapor generator 15 by means of a conduit pipe 22a. These members are so associated with one another that the liquid separated in the first stage vapor separating vessel 1 is allowed to pass into the lower liquid chamber 15b through said members in the order of 22, 21 and 22a, and to circulate through the circulating system consisting of said members in the order of 15, 15a, 19, 18, 20 and 15b.

The vapor condensing member 23, the inside portion of which is lined with a heat-insulating member 24 and equipped with perforated shower trays 23a, is now positioned in the vapor separating vessel 18 in association with an entrainment separating member 25, the second stage evaporating system being the final system in the instant embodiment. And the condensing member 23 is so spaced from the inner surface of the outer cylindrical wall of the vapor separating vessel 18 as to provide a suitable space for the vapor separated in the vapor separating vessel 18 to travel upward in a spiral movement round the condensing member 23, so that the vapor in the spiral movement flows into the condensing member 23 by way of the entrainment separating member 25 and passes downward through the condensing member 23 along with the cooling water showering therein by way of a nozzle 26, the cooling water being supplied by a cooling water supplying member, not shown.

The lower end of the condensing member 23 penetrates the bottom portion of the vapor separating vessel 18, and is provided with a barometric leg or down-take 27 terminating in a vessel 28. In the central space of the condensing member 23 is positioned longitudinally an exhaust pipe 29. The upper end of said pipe 29 is associated with an air exhausting member such as a vacuum pump, not shown, and the free lower end of said pipe 29 extends towards the bottom portion of the condensing member 23. The second stage vapor separating vessel 18 is also equipped with a liquid outlet pipe 30 which is connected to a level controller 31, and to said level controller 31 is connected a down-take 32 terminating in a concentrated liquid collecting vessel 33.

Furthermore, the first stage vapor generator 2 and the second stage vapor generator 15 are respectively equipped with a drainage outlet 34 and 35 and a non-condensible gas outlet 36 and 37. Said gas outlets 36 and 37 are associated respectively with the upper portion of the second stage vapor separating vessel 18 by means of a conduit pipe 38 and 39.

The operation of the apparatus of this invention illustrated hereinbefore is as follows:

Take for example as a material to be evaporated a portion of spent coagulating acid bath liquor employed in a rayon factory. The air previously existing in the apparatus is exhausted out of the system via the exhaust pipe 29. The liquor to be treated is introduced into the first stage vapor generator 2 by way of the inlet pipe 5, and the liquor is heated with live steam introduced thereby by means of the booster 17. The liquor being heated together with the vapor generator passes into the vapor separating vessel 1 by way of upper liquid chamber 2a and vapor-liquid conveying pipe 3, and the liquor returns to the vapor generator 2 by way of conduit pipe 4 and lower liquid chamber 2b, to repeat a circulatory movement throughout said members. The liquor is also allowed to pass into the lower liquid chamber 15b of the second stage vapor generator 15 by way of conduit pipe 22, level controller 21 and another conduit pipe 22a, and the liquor is further heated in the vapor generator 15 by means of the vapor which is separated in the first stage vapor separating vessel 1 and passes into the second stage vapor generator 15 by way of entrainment separating member 7, vapor scrubbing member 6 and conduit pipe 16. Then the liquor passes into the second stage vapor separating vessel 18 through the conduit pipe 19 and returns to the vapor generator 15 by way of conduit pipe 20 and lower liquid chamber 15b, to repeat a circulatory movement throughout said members. The liquor thus concentrated to a desired density is taken out of the system into the collecting vessel 33 by way of outlet pipe 30, level controller 31 and down-take 32.

In the course of the evaporating operation, a dilute solution of sodium hydroxide is showered into the vapor scrubbing member 6 by way of the nozzle 14a to remove undesired elements out of the vapor. In other words, the vapor which is separated in the first stage vapor separating vessel 1 is first relieved of entrainments by means of the entrainment separating member 7, and the vapor is further cleared of the remaining entrainments accompanying the vapor by means of the direct contact with the alkaline solution showering into the vapor scrubbing member 6 when the vapor passes downward therethrough along with said washing solution. At the same time, the vapor is cleared of hydrogen sulfide by means of said direct contact with the washing solution. Thus the vapor leaving the scrubbing member 6 is almost entirely free of acidic entrainments and acidic gas, remarkably improving thereby the durability of the heating members and other component parts of the system. The temperature of the washing solution is always maintained by means of the heating member 11 to the temperature of the vapor being separated in the vapor separating vessel 1, and the solution is caused to shower repeatedly into the vapor scrubbing member 6 by means of the pump 13, so as to circulate throughout said members in the order of 9, 13, 14a, 6 and 8. The used solution of lower alkalinity is taken out of the system by way of the outlet 12 attached to the vessel 9, and the solution can be profitably employed for desulphurizing viscose rayon, since the solution comes to contain much of concentrated sodium sulfide in the course of vapor washing. A fresh portion is supplied by way of the intake 10 attached to the vessel 9.

The cooling water is showered into the condensing member 23 occupying the second stage vapor separating vessel 18. The vapor separated in the vapor separating vessel 18 is removed of entrainments by means of the entrainment separating member 25, and the vapor passes into the condensing member 23 to condense itself almost entirely by means of the cooling water showering therein. The remaining non-consendible vapor is taken out of the system by way of the exhaust pipe 29. The condensing member 23 being insulated from the cooling water with a heat-insulating member 24, the vapor separated in the vapor separating vessel 18 does not freeze even if the vapor comes in direct contact with the outside surface of the condensing member 23.

In case the total volume of the vapor separated in the first stage vapor separating vessel 1 is employed as a means for heating the second stage vapor generator 15, an independent conduit pipe 17a is attached to the first stage vapor generator 2 to introduce therein live steam. The number of stages can be increased, and that of vapor generators in each stage is also increasable simply by way of associating with one another the upper liquid chambers by means of a circulation pipe and the lower liquid chambers by means of another circulation pipe. Throughout the entire system, however, the vapor condensing member is to be installed in the final stage vapor separating vessel.

It is thought that the invention and its advantages will be understood from the foregoing description and the accompanying drawings, and it is apparent that various modifications may be made in the form, construction and arrangement of the parts without departing from the scope and spirit of the invention or sacrificing its material advantages, the form hereinbefore described and illustrated in the drawings being merely one preferred embodiment thereof.

I claim:

1. A multiple effect vacuum evaporator comprising a plurality of stages each stage of which comprises at least one vapor generator and a single vapor separating vessel associated with one another, the vapor generator in each stage having a vapor-liquid conveyor pipe tangentially connected to the lower side portion of the vapor separating vessel and a liquid inlet pipe connected to the bottom side portion of said vapor separating vessel of the respective stage, a cylindrical vapor condensing member vertically positioned inside the vapor separating vessel in the last of said plurality of stages with the bottom end portion penetrating the bottom wall of the vapor separating vessel and spaced from the inner wall of the vapor separating vessel to provide an annular space in which the vapor separated in the vapor separating vessel can rise upward between the vapor condensing member and the outer cylindrical wall of the vapor separating vessel, be relieved of the entrainments and flow into the condensing member, means for showering a vapor condensing liquid medium into the top of the condensing member above said condensing member, a gas exhaust pipe positioned inside the vapor condensing member to exhaust the non-condensible gas out of the system, a cylindrical vapor scrubbing member vertically positioned inside each of the vapor separating vessels in the stages preceding said last stage with the bottom end portion of each vapor scrubbing member penetrating the bottom wall of the respective vapor separating vessels and spaced from the outer cylindrical wall of the respective vapor separating vessels to provide an annular space in each vessel in which the vapor separated in the vapor separating vessel can rise upward between the vapor scrubbing member and the outer cylindrical wall of the vapor separating vessel, be relieved of the entrainments and flow into the vapor scrubbing member, means for showering a scrubbing liquid medium into the top of the vapor scrubbing member and connected to the top of each vapor separating vessel having a vapor scrubbing member therein, and scrubbed vapor conduit means connecting the bottom end portion of the vapor scrubbing member in each stage with the vapor generator in each of the succeeding stages.

2. A multiple effect evaporator as claimed in claim 1 in which said vapor condensing member is heat insulated from said vapor separating vessel and has showering trays therein, and scrubbing member has showering trays therein.

3. A multiple effect evaporator as claimed in claim 1 in which said means for showering a scrubbing liquid medium comprises a nozzle above said vapor-scrubbing member, a vapor-scrubbing liquid medium downtake connected to the protruding bottom end of the vapor scrubbing member, a vapor-scrubbing liquid medium reservoir positioned at the lower end of said vapor-scrubbing liquid medium downtake, said reservoir being provided with a heating member for heating the vapor-scrubbing liquid medium, and a suction pump connected between the vapor-scrubbing liquid medium reservoir and the vapor-scrubbing liquid medium showering nozzle for circulating the vapor-scrubbing liquid medium through the vapor scrubbing member.

References Cited in the file of this patent

UNITED STATES PATENTS

| | | |
|---|---|---|
| 1,200,996 | Soderlund et al. | Oct. 10, 1916 |
| 1,213,596 | De Boufre | Jan. 23, 1917 |
| 1,325,461 | Barbet | Dec. 16, 1919 |
| 1,436,739 | Webre | Nov. 28, 1922 |
| 1,883,379 | Kermer | Oct. 18, 1932 |
| 2,394,643 | Switzer | Feb. 12, 1946 |
| 2,588,099 | Farnsworth | Mar. 4, 1952 |
| 2,746,536 | Sumiya | May 22, 1956 |
| 2,838,108 | Sumiya | June 10, 1958 |

FOREIGN PATENTS

| | | |
|---|---|---|
| 185,873 | Great Britain | Sept. 21, 1922 |